March 22, 1955
F. B. PERRI ET AL
2,704,620
APPARATUS FOR SUPPLYING FUEL TO THE FUEL TANK
OF AN OUTBOARD MOTOR FROM A PORTABLE FUEL CAN
Filed June 3, 1950
3 Sheets-Sheet 1
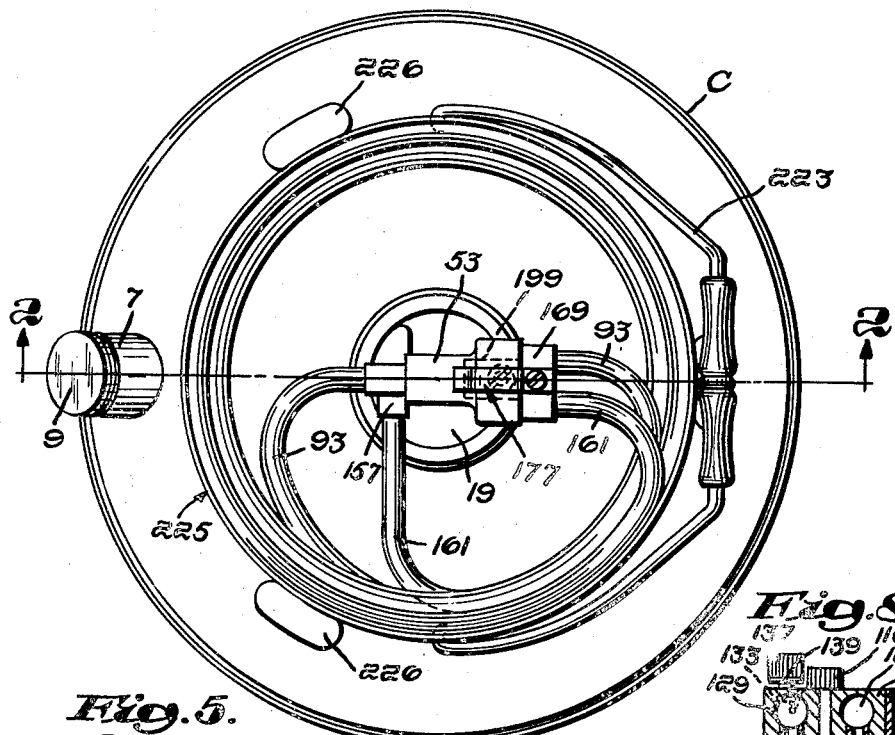
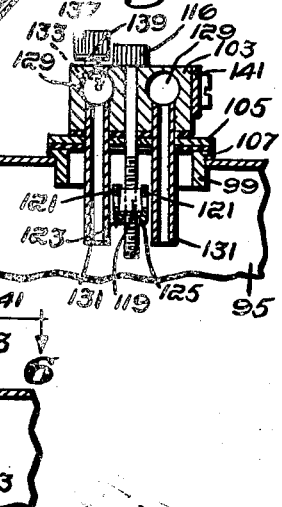
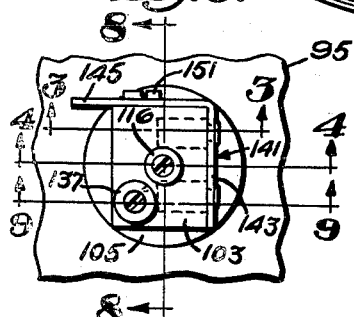
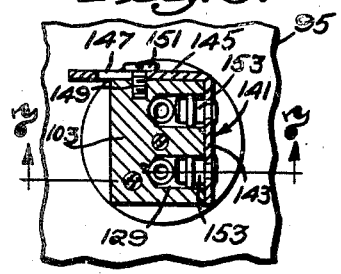
Inventors:
Frank B. Perri,
Peter B. Perri,
by Emery Booth Townsend Miller
att Neider Attys

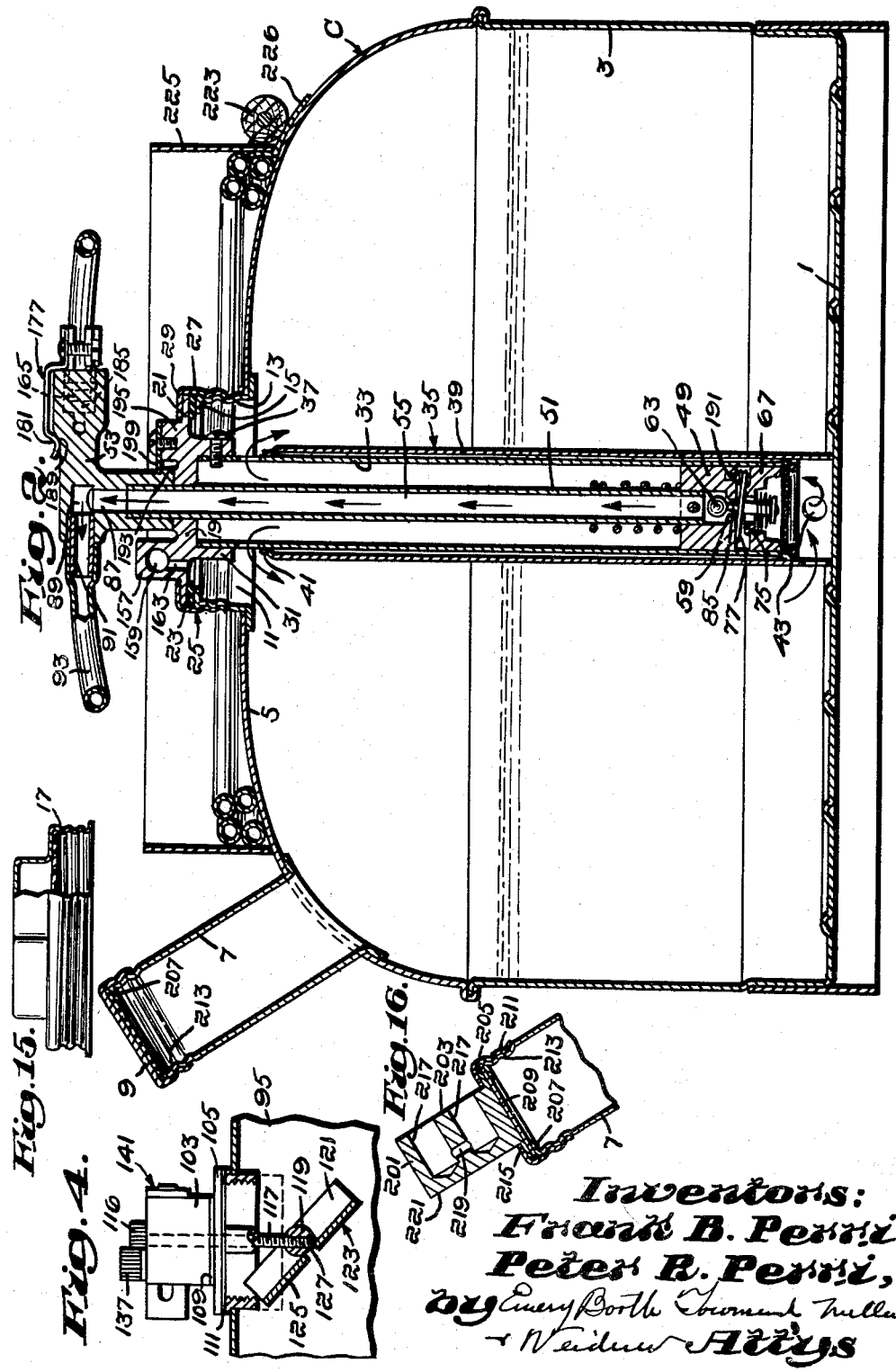

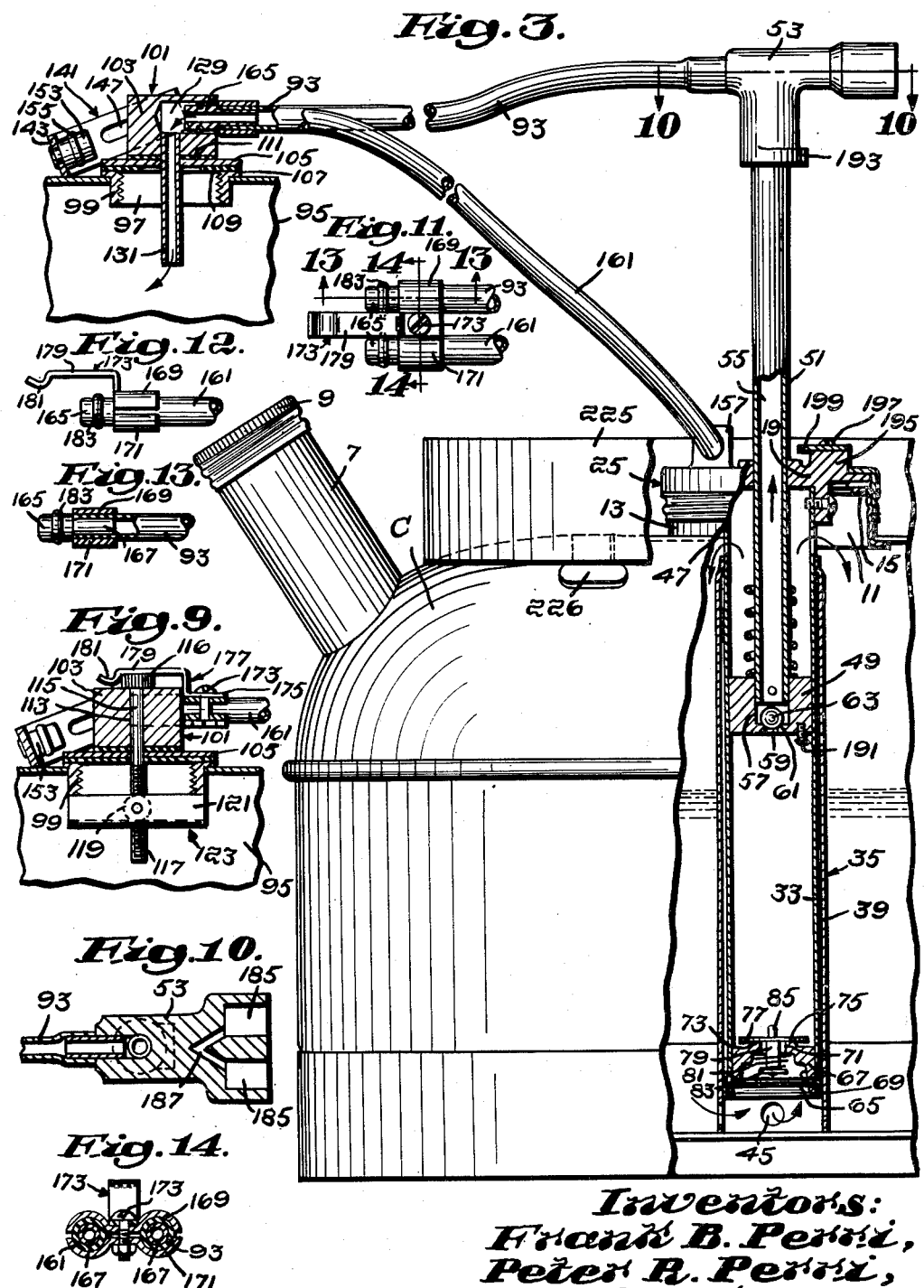

United States Patent Office 2,704,620
Patented Mar. 22, 1955

2,704,620

APPARATUS FOR SUPPLYING FUEL TO THE FUEL TANK OF AN OUTBOARD MOTOR FROM A PORTABLE FUEL CAN

Frank B. Perri and Peter R. Perri, Groveland, Mass.

Application June 3, 1950, Serial No. 165,958

7 Claims. (Cl. 222—118)

Our invention relates to apparatus for supplying from a portable fuel can fuel, such as gasoline, to the fuel tank of an outboard motor, the apparatus being particularly suitable, among other things, for use while the outboard motor is in operation.

The invention has among its objects provision for supplying the fuel to the outboard motor fuel tank without possibility of spilling the fuel, so as to eliminate fire hazard, and at the same time render both the motor and the fuel can independently portable without incurring spillage of the fuel from either.

The invention, however, will be best understood from the following description when read in the light of the accompanying drawings of several embodiments of the invention, while the scope of the invention will be more particularly pointed out in the appended claims.

In the drawings:

Fig. 1 is a plan of a portable fuel can with apparatus according to the present invention applied thereto;

Fig. 2 is a longitudinal vertical section on the line 2—2 of Fig. 1;

Fig. 3 is an elevation of the fuel can according to Figs. 1 and 2 with apparatus according to the present invention connecting it to the fuel tank of an outboard motor, with parts broken away, with parts in a different operative position as compared to Fig. 2, and with parts in section on the line 3—3 of Fig. 5 in a different operative position as compared to Fig. 5;

Fig. 4 is a section on the line 4—4 of Fig. 5, with parts in elevation, Fig. 4 illustrating a step in the operation of applying the apparatus to the filling opening of the fuel tank;

Fig. 5 is a plan of the parts shown by Fig. 4;

Fig. 6 is a section on the line 6—6 of Fig. 7;

Fig. 7 is a section on the line 7—7 of Fig. 6;

Fig. 8 is a section on the line 8—8 of Fig. 5;

Fig. 9 is a section on the line 9—9 of Fig. 5, with parts in a different operative position, and with the fuel hoses connected to those parts;

Fig. 10 is a section on the line 10—10 of Fig. 3;

Fig. 11 is a plan of the free ends of the hoses and associated parts;

Fig. 12 is an elevation of the parts shown by Fig. 11;

Fig. 13 is a section on the line 13—13 of Fig. 11;

Fig. 14 is a section on the line 14—14 of Fig. 11;

Fig. 15 is an elevation, with parts in section, of the cap for the filling opening of the fuel can; and Fig. 16 illustrates a detail of a modified form of apparatus according to the invention.

Referring to the drawings, the portable fuel can C illustrated comprises a container having the bottom wall 1 (Fig. 2), side walls 3 and top wall 5, the container shown being provided with a spout 7 which is normally closed by a cap 9 removably screw-threaded thereon. Also, as illustrated, the can has in its top wall a filling opening 11 constituted by an annular screw-threaded sleeve 13 interiorly communicating with the interior of the can and provided at its upper open end with an inturned annular flange 15. When the apparatus according to the invention is not applied to the can, normally the filling opening will be closed by screw-threading on the sleeve the removable cap 17 (Fig. 15) commonly employed for such purpose.

The apparatus according to the present invention comprises a cap or head 19 which is substituted for the cap 17 for applying such apparatus to the fuel can. As shown, a head 19 is provided with an annular peripheral flange 21 adapted to be positioned above the flange 15 of the sleeve 13, between which two flanges is positioned a flat annular gasket 23. For securing the head 19 to the sleeve 13 is provided a coupling sleeve 25 having the annular screw-threaded portion 27 adapted to be screwed on the sleeve 13 and having at its top an inturned annular flange 29 which engages the flange 21 on the head 19 to compress the gasket 23 and thus make a fluid tight joint between the head and the can to which it is applied.

Snugly received in the downwardly opening socket formed by the annular flange 31 (Fig. 2) on the underside of the cap or head 19 is the inner member 33 of a telescopic pump cylinder 35, this member 33 being fixedly secured to the flange 31 by one or more removable screws 37. The outer member 39 of the telescopic cylinder at its upper end has a reduced diameter portion 41 which snugly but slidably fits against the outer surface of the inner cylinder member 33, while the latter at its lower end has an enlarged diameter portion 43 which snugly but slidably fits against the inner surface of the outer cylinder member 39, this construction causing the outer cylinder member to be guided for longitudinal movement relative to the inner cylinder member. By elongating the telescopic pump cylinder, prior to inserting it in the can, the lower end of the outer cylinder member 39 will be brought into contact with the bottom wall 1 of the fuel can and will be maintained in that position when the cap or head 19 is secured to the can, in this way to permit the apparatus to be applied to cans of various heights. As shown, the lower end portion of the outer cylinder member 39 of the pump is provided with openings 45 for permitting entrance of fuel to the cylinder, while the upper end portion of the inner cylinder member 33 is provided with breather openings 47 placing the interior thereof in communication with the can above the level of the fuel therein.

In the pump cylinder 35 is reciprocally mounted a pump piston 49 to which is connected a piston rod 51 extending above the cap or head 19 and carrying at its upper end an operating handle 53. The piston rod is shown as tubular so as to form therein a longitudinally extending passage 55. This passage communicates with a through passage 57 (Fig. 3) in the piston, which latter passage fixedly receives the lower end of the piston rod. The passage 57 at its lower end is of reduced diameter, as shown at 59, to form a valve seat 61 for an inwardly opening ball check valve 63 received in the passage and retained therein by such reduced diameter portion and the lower end of the piston rod. At its lower end the inner pump cylinder member 33 carries a removable screen 65 (Fig. 3) above which is fixedly received a head 67 formed with a through opening 69 having at its upper end a reduced diameter portion 71, which reduced diameter portion is surrounded at its upper end by a raised annular flange 73 on the upper surface of the head 67, the upper surface of which flange forms an annular valve seat 75 for an inwardly opening check valve 77. As shown, the valve 77 is provided with a downwardly extending stem 79 received in the opening 69, 71 of the head 67, a light compression spring 81 surrounding the stem and bearing at one end against a head 83 at the lower end of the stem and at its upper end against the head 67 serving to urge the valve toward its seat. At its upper side the valve 77, for a purpose hereinafter described, is shown as provided with an upwardly extending projection 85.

In an obvious manner when the piston 49 is reciprocated by the handle 53 fuel will be pumped from the can through the hollow piston rod to the piston rod handle 53. This handle, as shown, is provided with a passage 87 (Fig. 2) which receives the fuel supplied it through the hollow piston rod. Communicating with the passage 87 is a lateral passage 89 opening on one end of the handle, which lateral passage receives a nipple 91 (Fig. 2), to the projecting end of which nipple is connected one end of a flexible fuel supply hose 93 preferably formed of transparent flexible material and adapted to be connected at its opposite end to the outboard motor fuel tank for supplying the latter with fuel.

The fuel tank 95 (Fig. 3) of the outboard motor is shown as provided with a filling opening 97 formed by the open ended sleeve 99 communicating with the interior of said tank. This sleeve, as shown, is interiorly screw-threaded, as in common practice, for removably receiving a screw-threaded closure for said tank for normally closing the filling opening of the latter. According to the present invention, for such closure is substituted a cap or head 101 which, as illustrated, comprises a block 103 (Figs. 3 to 9) and a plate 105. As shown, the plate 105 is supported on the flange 107 (Fig. 3) of the sleeve 99, while the block 103 is supported on the plate, compressible gaskets 109 and 111 being interposed between the flange and plate and between the plate and block, respectively. For securing the cap or head 101, constituted by the block 103 and plate 105, to the fuel tank the block is shown as provided with a through opening 113 (Fig. 9) through which extends the shank 115 of a screw having a knurled head 116 resting on the upper surface of the block. The lower screw-threaded portion 117 of the screw is screw-threaded into a through opening in a member 119 which at opposite ends is pivotally supported on the flanges 121 of the U-shaped member 123 (Figs. 4, 7, 8 and 9), the web 125 of this U-shaped member being provided with an opening 127 (Fig. 4) through which the screw is adapted to extend when the parts are in the position shown by Fig. 9. As indicated by Fig. 4, the U-shaped member 123 is adapted to be tilted relative to the member 119. By tilting the member 123 the requisite extent it may be inserted through the filling opening of the fuel tank, whereupon by rotation of the screw by means of its head 116 the member 123 may be caused to engage the lower edges of the sleeve 99, as shown by Fig. 9, securely but removably to lock the block 103 and plate 105 to the fuel tank and compress the gaskets 109 and 111 for rendering the joints fluid tight.

As shown, the block 103, constituting part of the cap or head 101, is formed with two spaced sockets 129 (Figs. 3, 7 and 8) extending horizontally inward from one vertical side of the block. Into each of these sockets opens the bore of a vertical tube 131 fixedly carried by the block, such tubes forming tubular extensions projecting downward into the outboard motor fuel tank with their lower ends, as shown, at a common level. Communicating with one of the sockets 129 is a vent passage 133 (Fig. 8) which opens on the upper surface of the block 103. Screw-threaded into the block is a screw 135 (Fig. 7) having a knurled head 137 (Figs. 7 and 8) which at its under flat side carries a compressible annular gasket 139 adapted to close the vent when the screw is rotated inward in such direction as to move the gasket toward the block. As shown, the block 103 carries an L-shaped member 141 having the legs 143 and 145 (Figs. 3 and 5). The leg 145 is shown as provided with a longitudinally extending slot 147 through which extends the shank 149 (Fig. 6) of a screw tapped into the block 103, the screw having a flat head 151 resting against the outer side of the leg 145 for movably securing the member 141 to the block. The leg 143 of the member 141, as shown, at its inner side carries a pair of projecting plugs 153 (Figs. 6 and 7) adapted to be loosely received in the sockets 129 when the member 141 is moved to its position shown by Figs. 6 and 7, the blocks carrying ring-shaped gaskets 155, of yieldable material, adapted to engage the walls of the sockets 129 and make fluid tight joints between such walls and the plugs. By reason of the slot 147 the plugs may be pulled from the sockets 129 and placed in their out of the way positions shown by Figs. 3 and 9 to open said sockets.

The cap or head 19 applied to the fuel can C is shown as provided with a raised boss 157 (Figs. 1, 2 and 3) in which is formed a passage 159 opening on the end of the boss, a flexible fuel return hose 161, also preferably of transparent plastic material, being connected to this passage in the same way as the fuel supply hose 93 is connected to the passage 89 in the handle 53. This passage 159 is placed in communication with the under side of the cap or head 19 by the passage 163 (Fig. 2) so as to place the hose 161 in communication with the interior of the can.

The ends of the hoses 93 and 161 opposite their ends connected to the pump handle and cap 19 are shown as provided with tubular nipples 165 (Figs. 3 and 11 to 14), these nipples having reduced end portions 167 (Fig. 13) over which the ends of the hoses are slipped. The hoses are clamped to these reduced end portions of the nipples and the two nipples rigidly connected together in spaced relation by the clips 169 and 171 which embrace the hoses and are clamped together by a bolt 173. This bolt extends through the base portion 175 of a spring clip 177 having the projecting portion 179 which at its outer end is bent to form a hook-shaped portion 181. The nipples 165 are adapted to be received in the sockets 129 of the block 103, attached to the fuel tank, when the plugs 153 are removed from said sockets, as illustrated in Fig. 3. The nipples loosely fit the sockets 129 and are provided with ring-shaped gaskets 183, of yieldable material, which engage the walls of those sockets to make fluid tight joints between them. When the nipples are inserted the hook-shaped end of the clip snaps over the head 116 of the screw 115, 117 for removably holding the nipples in the sockets.

When the nipples 165 are connected as above described to the block 103 of the cap or head 101, and that head is secured to the fuel tank at its filling opening, operation of the piston 49 will pump fuel through the supply hose 93 from the fuel can and fill the fuel tank until the upper level of the fuel in the tank submerges the lower ends of the tubes 131 in the fuel tank, whereupon continued operation of the pump will serve to force excess fuel from the fuel tank back to the fuel can by way of the hose 161.

As shown, that end of the pump piston operating handle 53 which is opposite the end thereof to which the hose 93 is connected is provided with a pair of outwardly opening sockets 185 (Fig. 10) which at their inner ends are connected by a passage 187. When the nipples 165 at the free ends of the hoses are detached from the block 103 at the filling opening of the fuel tank said nipples may be inserted in the sockets 185, as indicated in Fig. 2. When so inserted the hooked end 181 of the clip 177 will snap over the shoulder 189 on the handle to hold the nipples in said sockets, the gasket rings on the nipples making fluid tight joints between the nipples and the walls of the sockets. When so attached to the handle the passage 187 will place the hoses in fluid communication.

As shown, the pump piston 49 is provided on its under side with a downwardly projecting screw 191 (Figs. 2 and 3) which, when the piston is moved below the end of its normal downward stroke, engages the check valve 77 to tilt it and hold it off its seat 75 as shown in Fig. 2. At the same time the projection 85 of said valve 77 enters the passage 57 of the piston to engage the check valve 63 and hold it also off its seat.

The operating handle 53 for the piston is shown as provided with a lateral projection 193 (Figs. 2 and 3), while the cap or head 19 is provided with a raised boss 195 to the upper side of which is secured by means of one or more screws 197 (Fig. 3) a plate 199 (Figs. 1, 2 and 3). When the piston is moved to its position shown by Fig. 2 the handle 53 may be rotated to bring the projection 193 under the projecting end of the plate 199 removably to hold the piston in that position.

Instead of providing for attachment of the free ends of the hoses to the pump piston handle for placing such hoses in fluid communication, the modification shown by Fig. 16 may be employed. According to this modification, a block 201 having a flat side 203 and an exteriorly circular flange 205 at its base is employed. By removing the cap 9 of the spout 7 of the fuel can the flanged base of the block 201 may be placed on the inturned flange 207 of the filling spout with the annular gasket 209, of yieldable material, between them. The block may be coupled to the end of the spout by a coupling sleeve having the screw threaded portion 211 for engaging the screw-threads 213 on the spout and having an inturned annular flange 215 for engaging the upper surface of the flange 205, the block under these conditions serving as a substitute for the cap 9 of the spout shown in Fig. 2. As illustrated, the block 201 is formed with a pair of spaced sockets 217 opening on its flat side 203 and connected at their inner ends by a passage 219, these sockets and passage corresponding to the sockets 185 and passage 187 of Fig. 10. The nipples 165 at the free ends of the hoses may be inserted in the sockets 217 to place said hoses in fluid communication, the hooked end 181 of the clip 177 under these conditions snapping over and engaging the upper end portion of the side 221 of the block 201 to hold the nipples within the sockets, and the gaskets 183 on the nipples making fluid tight joints between the nipples and the walls of the sockets.

As shown, the top of the fuel can is provided with an upstanding circular flange 225 secured to the body of the can by L-shaped brackets 226 the legs of which are welded to said flange and the can. Carried by the flange 225 is a bail 223 for carrying the can about.

The operation of the apparatus is as follows: By removing the cap 17 of Fig. 15 from the filling opening of the fuel can the fuel pump cylinder may be inserted in said can and secured thereto by the coupling sleeve 25, as hereinbefore described. The cap which closes the fuel tank of the outboard motor may be removed and the cap or head 101 of Fig. 3 substituted for it, as hereinbefore described. By withdrawing the closure plugs 153 from the sockets 129 in the block 103 the nipples 165 at the free ends of the hoses may be connected to said block, whereupon the piston 49 may be operated to force fuel from the fuel can to the fuel tank of the outboard motor by way of the fuel supply hose 93. When the fuel reaches such level as submerges the lower ends of the tubes 131 extending into the fuel tank any further fuel supplied the latter from the fuel can by continued operation of the pump will return by way of the hose 161 to the fuel can so that this level will not be exceeded. This filling operation may be done while the motor is in operation, the construction employed preventing any possibility of spillage of fuel on the motor, which, if it occurred and the motor were in operation, would result in extreme fire hazard. If it is desired to detach the outboard motor from the boat and transport the motor the sockets 129 may be closed in a fluid tight manner by inserting the closure plugs 153 in said sockets in the way hereinbefore described. The vent passage 133 in the block 103 may be opened for venting the fuel tank when the motor is in operation. Preferably this vent passage communicates with the socket 129 to which the fuel return hose 161 is connected so that it will be unnecessary to close the vent passage unless the motor is detached from the boat or the fuel tank is filled by any given pumping operation to such level as causes fuel to be returned to the fuel can by way of the hose 161, it being observed that if the vent passage communicated with the socket 129 to which the fuel supply hose 93 is connected fuel would tend to escape through the vent passage if the latter were open whenever fuel was being pumped into the fuel tank, which would create a fire hazard. When it is desired to detach the hoses from the cap or head 101 at the filling opening of the fuel tank the nipples 165 at the free ends of said hoses may be inserted in the sockets 185 of Fig. 10 or sockets 217 of Fig. 16 to place them in fluid communication, under which conditions if the piston of the fuel pump is operated no spillage of fuel will occur because the fuel hose 161 will return to the can such fuel as is pumped therefrom. When it is desired to drain the hoses the pump piston may be moved to its position shown by Fig. 2 to open the check valves 63 and 77, whereupon by elevating the free ends of the hoses the fuel therein will drain into the tank, in which connection it will be observed that although the fuel in the return hose 161 will drain into the can if the free ends of the hoses are elevated such may not be the case with the supply hose 93 because the check valves 63 and 77 will prevent such drainage unless they are held in open position. When the hoses are detached from the fuel tank, and the fuel can is to be transported, say by carrying it by means of its bail 223, the piston may be locked in its position shown by Fig. 2 by moving the projection 193 on the pump piston handle 53 under the projecting end of the plate 199 in the way hereinbefore described, which will hold the piston 49 and parts connected thereto in the position shown by Fig. 2. Likewise, when the can is transported, the hoses may be coiled within the recess provided by the flange 225, and conveniently when so coiled the free ends of the hoses are connected either to the pump piston handle 53 or to the block 201 to secure the free ends of the hoses to the can.

It will be understood that the invention is not limited to filling the fuel tanks of outboard motors, but may be used for filling the fuel tank of any motor or other fuel burning instrumentality, and that within the scope of the appended claims wide deviations may be made from the forms of the invention herein described without departing from the spirit of the invention.

We claim:

1. Apparatus for supplying fuel to a fuel tank having a filling opening from a portable fuel can or the like also having a filling opening, which apparatus comprises a pump having a pump cylinder adapted to be inserted in said can through the filling opening thereof, a supporting head for said cylinder having means for cooperating with said can for attaching said head thereto for closing said filling opening of said can, a pump piston in said cylinder, a manually operated piston rod for said piston extending through said supporting head to its exterior, said piston and rod being formed with a passage for discharge of fuel from said can when said piston is operated, an inwardly opening check valve at the lower end portion of said cylinder for admitting fuel from said can to said cylinder, an inwardly opening check valve carried by said piston for admitting fuel from said cylinder to said passage, a second head adapted to be secured to the fuel tank for closing the filling opening thereof, which second head is provided with a pair of passages opening on its exterior each comprising a tubular projection from said head extending into said fuel tank when said second head is applied thereto for determining the extent to which said tank may be filled with fuel by said pump, a fuel supply hose connected at one end thereof to said passage of said piston rod, a passage formed in said cylinder supporting head opening into the can when such head is applied to the latter, a fuel return hose connected at one end thereof to said passage of said supporting head, means for detachably placing the opposite end of one of said hoses in fluid communication with one of said passages of said second head and the corresponding end of the other of said hoses in fluid communication with the other of said passages whereby to supply fuel to said tank from said can when said piston rod is operated and to return excess fuel to said can when said tank is filled to such extent as submerges the lower ends of said tubular projections, means carried by said piston and said check valve for said cylinder for holding that check valve and the check valve for said passage of said piston rod, respectively, in open position when said piston is below the end of its normal downward stroke for permitting draining of said fuel supply hose into said can, and means for detachably locking said piston in such position.

2. Apparatus for supplying fuel to a fuel tank having a filling opening from a portable fuel can or the like also having a filling opening, which apparatus comprises a first head adapted to serve as a removable closure for said filling opening of said can, a pump carried by said head having a cylinder adapted to be inserted in said can through the filling opening thereof when said head so serves, said pump having a piston adapted to be operated from the exterior of said can when said cylinder is so inserted, a fuel supply hose for said tank leading from said pump having a free end, a fuel return hose having a free end, the other end of which fuel return hose is carried by said first head and communicates with said can when such head so serves, a second head adapted to serve as a removable closure for the filling opening of said tank, means for readily detachably connecting said free ends of said hoses to said second head; means associated with said second head in fluid communication with said hoses and tank when such head so serves and said hoses are attached to it for supplying said tank with fuel from said can by way of said fuel supply hose upon said piston being operated and for returning to said can by way of said fuel return hose excess fuel upon said piston being operated after said tank is filled to a predetermined level by operation of said piston; and means to which the free ends of said hoses may be readily detachably connected when detached from the second head, which means presents a passage for placing said free ends in fluid communication when said free ends are connected to it.

3. Apparatus for supplying fuel to a fuel tank, having a filling opening, from a portable fuel can or the like also having a filling opening, which apparatus comprises a first head adapted to serve as a removable closure for said filling opening of said can, a pump carried by said head having a cylinder adapted to be inserted in said can through the filling opening thereof when said head so serves, said pump having a piston adapted to be operated from the exterior of said can when said cylinder is so inserted, a fuel supply hose for said tank leading from said pump having a free end, a fuel return hose having a free end, the other end of which fuel return hose is carried by said first head and communicates with said can when such head so serves, a second head adapted to serve as a removable closure for the filling opening of said tank, means for readily detachably connecting said free ends of said hoses to said second head; means associated with said second head in fluid communication with said hoses and tank when such head so serves and said hoses are attached to it, for supplying said tank with fuel from said can by way of said fuel supply hose upon said piston being operated and for returning to said can by way of said fuel return hose excess fuel upon said piston being operated after said tank is filled to a predetermined level by operation of said piston; said pump cylinder being vertically positioned when inserted in the can and having a pump piston provided with a piston rod for operating it from the exterior of the can from above the latter, which piston rod is formed with a fuel discharge passage leading to the exterior of the can when said cylinder is inserted in the can, to which passage said fuel supply hose is connected; an inwardly opening check valve carried by the cylinder at its lower end portion for admitting fuel from the can to said cylinder when the latter is so inserted; an inwardly opening check valve carried by the piston for admitting fuel from the cylinder to said fuel discharge passage; said piston carrying means for engaging the check valve carried by the cylinder for holding said valve in open position when said piston descends to a position beyond the end of its normal inward operating stroke, and said cylinder operatively having means for engaging said check valve carried by the piston for holding said valve in open position when said piston is in such position, whereby when the piston is in such position fuel may be drained from said fuel supply hose into the can by way of said piston rod and cylinder.

4. Apparatus according to claim 3 in which the check valve carried by the cylinder has a projection adapted to enter the lower end of the fuel discharge passage for holding the check valve carried by the piston in open position when the piston is positioned beyond the end of its normal inward operating stroke.

5. Apparatus according to claim 3 in which the two check valves have cooperating portions adapted to be brought into contact when said piston is positioned beyond the end of its normal inward operating stroke for holding the check valve carried by the piston in open position.

6. Apparatus for filling a liquid fuel tank having a filling opening, which apparatus comprises a head adapted to serve as a removable closure for such filling opening, said head presenting a pair of passages each opening at one end on the exterior of said head exteriorly of said tank when said head so serves and at its other end below such filling opening in communication with the interior of said tank, a fuel storage can, a fuel supply hose and a fuel return hose each having a free end and having its opposite end connected to said can, a pump carried by said can for supplying fuel from said can to said fuel supply hose, means for detachably connecting the free ends of said hoses to said head in fluid communication with said passages, respectively, said apparatus also comprising means to which said free ends may be removably attached when disconnected from said head, said last mentioned means presenting a passage for placing said free ends in fluid communication when attached to it; the pump being single acting and comprising a cylinder and a reciprocatory piston, the pump having an inlet opening controlled by a check valve for receiving fuel from the can when the piston makes a stroke in one direction and having an outlet opening controlled by a second check valve for delivering fuel from the cylinder to the fuel supply hose when the piston makes a stroke in the opposite direction, and means for holding both check valves in open position when said piston is positioned beyond the end of its normal stroke in the last mentioned direction.

7. Apparatus for supplying fuel to a fuel tank, having a filling opening, from a portable fuel can or the like also having a filling opening, which apparatus comprises a first head adapted to serve as a removable closure for said filling opening of said can, a pump carried by said head having a cylinder adapted to be inserted in said can through the filling opening thereof when said head so serves, said pump having a piston adapted to be operated from the exterior of said can when said cylinder is so inserted, a fuel supply hose for said tank leading from said pump having a free end, a fuel return hose having a free end, the other end of which fuel return hose is carried by said first head and communicates with said can when such head so serves, a second head adapted to serve as a removable closure for the filling opening of said tank, means for readily detachably connecting said free ends of said hoses to said second head; and means associated with said second head in fluid communication with said hoses and tank when such head so serves and said hoses are attached to it for supplying said tank with fuel from said can by way of said fuel supply hose upon said piston being operated, and for returning to said can by way of said fuel return hose excess fuel upon said piston being operated after said tank is filled to a predetermined level by operation of said piston; said means associated with the second head presenting a pair of passages each opening at one end at the exterior of said head at a position which is outside the tank when said head serves as the closure for the filling opening of said tank and, at its other end when said head so serves, opening into said tank below its filling opening for determining the level to which the tank may be filled; the means for connecting the free ends of the hoses to said second head placing them in fluid communication with those ends of said passages, respectively, which are so adapted to be positioned at the exterior of said tank.

References Cited in the file of this patent

UNITED STATES PATENTS

| | | |
|---|---|---|
| 67,666 | Merrill et al. | Aug. 13, 1867 |
| 792,857 | Strong | June 20, 1905 |
| 1,112,082 | Mulligan | Sept. 29, 1914 |
| 1,613,845 | Peterson | Jan. 11, 1927 |
| 2,401,124 | Walker | May 28, 1946 |